United States Patent [19]

Cancellieri

[11] Patent Number: 5,549,742
[45] Date of Patent: Aug. 27, 1996

[54] ASSEMBLY OR SET OF DIFFERENT COLOR INKS AND AN ASSEMBLY OF WRITING INSTRUMENTS

[75] Inventor: Jorge Cancellieri, Victoria, Argentina

[73] Assignee: Gillette Company, Boston, Mass.

[21] Appl. No.: 397,235

[22] PCT Filed: Sep. 16, 1993

[86] PCT No.: PCT/US93/08755

§ 371 Date: Apr. 27, 1995

§ 102(e) Date: Apr. 27, 1995

[87] PCT Pub. No.: WO94/06872

PCT Pub. Date: Mar. 31, 1994

[30] Foreign Application Priority Data

Sep. 18, 1992 [AR] Argentina .................. 323209

[51] Int. Cl.⁶ .................. C09D 11/02
[52] U.S. Cl. .................. 106/22 B; 106/20 A
[58] Field of Search .................. 106/22 B, 21 A, 106/20 A

[56] References Cited

U.S. PATENT DOCUMENTS

| | | | |
|---|---|---|---|
| 2,029,152 | 1/1936 | Bonkowski | 401/186 |
| 2,559,608 | 7/1951 | Ehrlich | 282/28 |
| 3,886,083 | 5/1975 | Laxer | 106/21 A |
| 3,941,488 | 3/1976 | Maxwekk | 401/199 |
| 4,139,965 | 2/1979 | Curry et al. | 46/1 R |
| 4,156,657 | 5/1979 | Lin | 106/22 B |
| 4,171,982 | 10/1979 | Lin | 16/22 B |
| 4,213,717 | 7/1980 | Lin | 106/22 B |
| 4,227,930 | 10/1980 | Lin | 106/22 B |
| 4,228,028 | 10/1980 | Lin | 106/22 B |
| 4,252,845 | 2/1981 | Griffiths et al. | 106/21 A |
| 4,262,936 | 4/1981 | Miyamoto | 106/21 R |
| 4,681,471 | 7/1987 | Hayduchok et al. | 401/34 |
| 5,006,171 | 4/1991 | Mecke et al. | 106/21 |
| 5,059,244 | 10/1991 | King et al. | 106/22 B |
| 5,232,494 | 8/1993 | Miller | 106/22 B |
| 5,324,131 | 6/1994 | Gardner, III | 401/199 |
| 5,326,388 | 7/1994 | Miller et al. | 106/22 B |
| 5,352,282 | 10/1994 | Miller | 106/22 B |
| 5,378,752 | 1/1995 | White et al. | 524/418 |
| 5,427,278 | 6/1995 | Gardner, III | 106/22 B |
| 5,460,647 | 10/1995 | Snedeker et al. | 106/22 B |
| 5,464,470 | 11/1995 | Brachman et al. | 106/22 B |

FOREIGN PATENT DOCUMENTS

| | | |
|---|---|---|
| 32653 | 7/1981 | European Pat. Off. . |
| 32652 | 7/1981 | European Pat. Off. . |
| 2216951 | 10/1973 | Germany . |
| 2450720 | 10/1974 | Germany . |
| 2349086 | 4/1975 | Germany . |
| 2724820 | 3/1979 | Germany . |
| 2834459 | 3/1980 | Germany . |
| 2616259 | 12/1981 | Germany . |
| 3919588 | 12/1989 | Germany . |
| 58-162674 | 9/1983 | Japan . |
| 63-175082 | 7/1988 | Japan . |
| 02099570 | 4/1990 | Japan . |
| 2097574 | 4/1990 | Japan . |

Primary Examiner—Helene Klemanski
Attorney, Agent, or Firm—Fish & Richardson P.C.

[57] ABSTRACT

An assembly or set of different color inks (10), capable of changing their color by reduction, comprising at least one ink (12) including a reducing agent for the mentioned inks. When one of said reducible inks (10) is contacted with that ink (12) bearing the reducing agent, the reducible ink (10) is reduced, changing its color, and juxtaposition or combination (11b) of the reduced ink color with the reducing ink color generates a different color for each ink. These inks are useful for composing polychromatic figures, designs, etc. for didactic and artistic purposes and the like, with writing or drawing instruments, such as fiber pens.

14 Claims, 1 Drawing Sheet

ASSEMBLY OR SET OF DIFFERENT COLOR INKS AND AN ASSEMBLY OF WRITING INSTRUMENTS

FIELD OF THE INVENTION

The present invention relates to colored inks reacting therebetween, for producing colors different from those of any of them.

BACKGROUND OF THE INVENTION—PRIOR ART

The fact of composing polychromatic figures changing the color of lines, blots and drawings on paper, cardboard, etc. by chemical means is known and widespread as from the end of the 80's. In general, it deals with the application of inks formulated with coloring substances the structure of which includes reducible groups or bonds, whose reduction "in situ" with a suitable reducing agent causes the turning of the color of those portions touched or contacted by the reducing agent, when passing from the oxidized form to the reduced form. Of course, these are inks formulated with coloring substances the reduced form of which is not a leukobase: i.e., when the reduced form is clearly colored and specially makes contrast with the color of the oxidized form.

The idea of composing polychromatic figures by chemically acting on figures, blots, etc. of different colors has been commercialized under various generic names such as "magic inks" as, for example, the product called "Magicolor"

(Registered Trademark) developed by Sylvapen Distrib. S.A.C.I.F and other similar products based on the same principle.

In practice, these kinds of products are sold in assemblies or sets formed by writing and/or drawing fiber units or instruments, which are, per se, well known. Such sets include a plurality of instruments, one for each reducible color and another unit carrying the reducing agent and commonly called "eraser"—magic line (or stroke)—in the mentioned Magicolor product. In general, the eraser includes a sodium sulphite solution as reducing agent; although other reducing agents have also been proposed and tested, such as sodium thiosulphite, hydrosulphite and bisulphite, as well as the corresponding potassium salts, and even some organic reducing agents, such as formaldehyde or hydroquinone.

Therefore, products designated "magic inks", also known as "turnable inks", include an assembly of inks sensitive to a reducing agent (called "reducible ink" henceforward), carried by in writing and/or drawing instruments, while the reducing agent is contained in, and dispensed from, another similar instrument, whose lines or strokes are uncolored. I.e., the path of the instrument bearing the writing agent on paper, for example, is only distinguished at the regions covered by reducible inks, revealed by the appearance of the colors corresponding to the reduced forms of said inks.

Therefore, the color combination afforded by conventional "magic inks" or multiple color inks is limited by the number of reducible inks; i.e. by the number of writing and/or drawing instruments (henceforward also called "color units"). In fact, each color unit gives two different colors: one corresponding to the unreduced form and the other to the reduced form of each ink. In this way, the color spectrum which may be obtained with conventional multiple color inks only comprises colors of each ink and colors of the reduced form thereof, without any chromatic addition from the instrument carrying the reducing agent (from now on also called "reducing unit").

SUMMARY OF THE INVENTION

It has been found that it is possible to broaden the chromatic spectrum of multiple color inks associating, into a single color unit, a non reducible ink having a particular color by inclusion of a coloring agent in the formulation and the reducing agent for the remaining inks (reducible inks). Therefore, it is possible to form a broader and more varied color spectrum, since the color of the non reducible ink is added to the colors afforded by non reduced and reduced reducible inks, respectively, the non reducible ink bearing the reducing agent, and the color range from the combination or juxtaposition of the reduced form of each reducible ink with the non reducible ink.

In brief: the invention relates to multiple color inks and corresponding writing and/or drawing instruments, wherein the reducing agent is associated to, or included into, a non reducible ink. In practice, the so-called "eraser" unit is colored with permanent coloring, opposite to conventional "magic inks", wherein the "eraser" is colorless.

BRIEF DESCRIPTION OF THE INVENTION

One object of the invention is an assembly or set of drawing or writing inks, of different colors or of multiple colors changing their color by reduction, and at least a non reducible ink, the formulation of which includes a reducing agent for said reducible inks, the ink carrying the reducing agent, for producing a different and unexpected chromatic effect with each reduced ink, different from the chromatic effect produced in the absence of the reducing reaction.

Another object of the invention is a writing or drawing instrument assembly with multiple color strokes or characters, each of which comprises a reservoir containing a different color reducible ink, additionally at least one of the instruments in the assembly contains a non reducible ink comprising a reducing agent for the inks of the remaining instruments, the non reducible ink producing, with the reduced inks, a chromatic effect different from that produced when two of the non reduced reducible inks are mixed or overlapped on a substrate such as paper, glass or metal sheet, or on a plastic surface.

A further object of the invention is an assembly or set of multiple color inks which, apart from the reducible inks and from the non reducible ink bearing the reducing agent, may also include the reducing agent diluted into a colorless vehicle.

A further object of the invention is an assembly comprised by two inks: a reducible ink containing a coloring agent or coloring agent mixture which changes its color when reduced, and a non reducible ink containing a reducing agent for said reducible ink, and further comprising a non reducible coloring agent or a mixture of coloring agents reacting with the reducible ink, for producing a chromatic effect from the reduction color and non reducible coloring agent mixture.

An additional object of the invention is an assembly or set of drawing or writing instruments each of which includes a different color reducible ink; further, at least one of said instruments including a non reducible ink carrying the reducing agent for the reducible inks. In addition, the assembly may include an instrument including the reducing agent diluted into a colorless vehicle, the non reducible ink producing an unexpected chromatic effect with the reduced inks, different from that produced with the non reduced inks, when at least one of the non reduced inks are mixed or overlapped.

Definitions

Reduction color is the color resulting from the mixture of reducing ink and reducible ink.

Reducible ink is a colored solution changing its color when contacted with suitable reducing substances under the application conditions.

Reducing ink is a colored solution containing a reducing agent or material, capable of reducing the reducible ink, under the application conditions.

Coloring substances and coloring agents are used, indistinctly, for individualizing the organic colored substances capable of giving a permanent and perceivable color in solution.

DETAILED DESCRIPTION OF THE INVENTION

Figure 2:
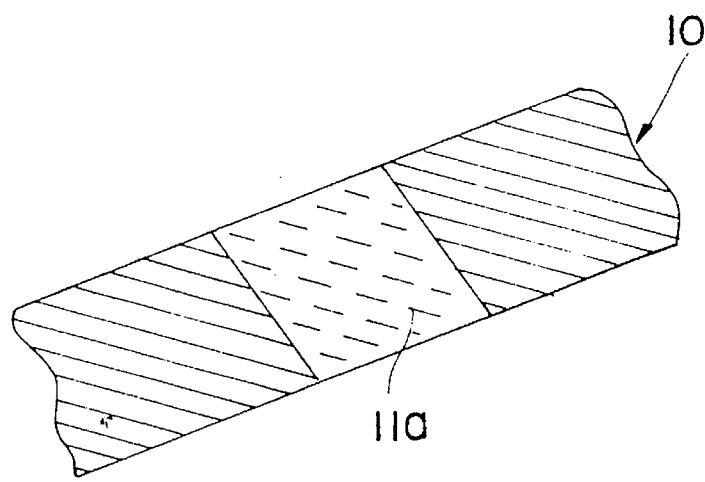
FIG. 2 shows the effects obtained with conventional turnable inks.

Reference numeral 10 in FIG. 2 corresponds to strokes or lines made with one ink of the assembly of conventional multiple color inks, crossed by clearer lines 11a, due to the reduction of ink 10. In this case, the path or travel of the instrument carrying the reducing agent is only partly revealed by a single area; the reduction of ink 10 in the region or zone 11a.

Figure 1:
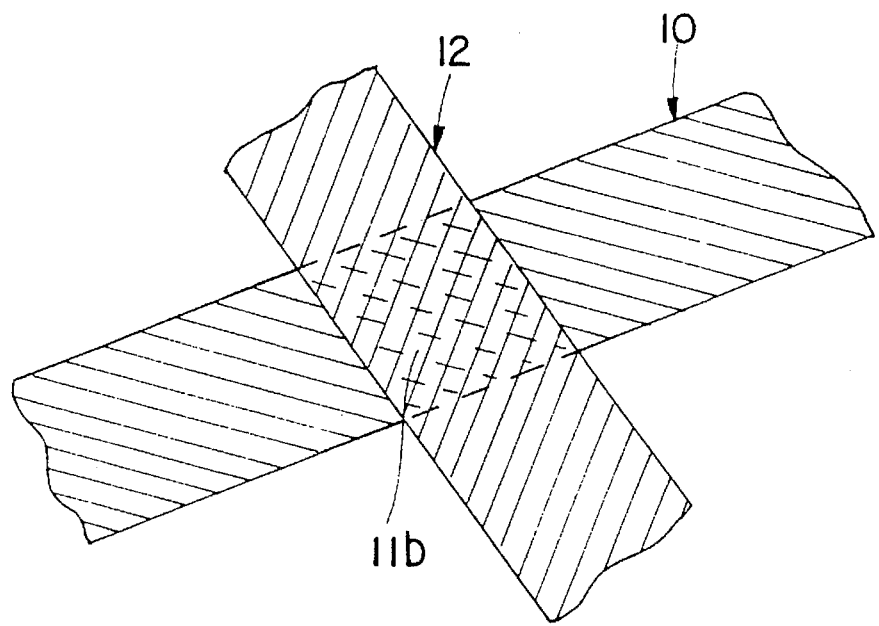
FIG. 1 shows the chromatic effects with multiple color inks according to the invention.

In FIG. 1, reference 10 corresponds to lines with reducible ink 10, as that of FIG. 2, crossed by a region or zone 11b, corresponding to the chromatic combination of the color of the reduced form of the ink 10 and the color of the non reducible ink, containing the reducing agent for ink 10. In this case, the passage of the reducing agent is apparent due to the formation of said region or zone 11b and due to lines 12, because of the color of the non reducible ink, in accordance with the invention.

The assembly or set of multiple color inks according to the invention allows obtaining a broader polychromatic effect in what concerns the color range and the possibility of obtaining different color lines, figures, blots, etc., as compared to known magic inks. It has been already indicated that the instant invention adds to colors of reducible inks and colors of reduced reducible inks (B), non reducible ink color (A) and colors resulting from the optical composition (combination) of (A)+(B) to the color spectrum of conventional multiple color inks.

Obviously, chromatic effects depend, in quality and quantity, on the nature of the coloring agent formulated with the non reducible ink, as well as on the coloring agents formulated in reducible inks; i.e. the diversity and strength of colors depends on the choice of the coloring agents of both types (reducible and non reducible).

Nevertheless, the instant invention is not specifically related to a family or kind of coloring agents or of any other type; any of known reducible coloring agents applied to known multiple color inks may be used in the instant invention. The following reducible coloring substances recorded in the Colour Index (C.I.) are preferred: Basic Red 18; Basic Red 19; Food Red 7; Basic Yellow 28; Acid Yellow 9; Acid Blue 93:2 Basic Blue 9; Basic Green 1; Basic Violet 10; Acid Orange 8; Basic Red 14, Basic Red 49, Basic Green 4 and mixtures thereof. A possible non reducible ink formulation comprises, for example: 8–10% sodium sulphite, 15% triethanolamine (TEA) and non reducible coloring agents comprising 3.0% Direct Blue 86; or 2.0% Solvent Green 7; or 0.6% Acid Red 52 or 2.0% Acid Blue 1 (percentages by weight); or mixtures thereof.

Also, the invention does not depend particularly on non reducible coloring agents; generally any stable or solid coloring agent in the same formulation along with the reducing agent and complying with the conditions of the invention for non reducible coloring agents may be used; preferably coloring substances recorded in the C.I. such as: Direct Blue 86; Solvent Green 7; Acid Red 52 and Acid Blue 1, and mixtures thereof.

The reducing agent common to multiple color inks is sodium sulphite, used in the formulation called "eraser" or "magic line" (Sylvapen). Although other reducing agents such as bisulphites, thiosulphites, are also useful in the instant invention, sodium sulphite and alkaline metal hydrosulphites are preferred, including organic reducing agents such as hydroquinone and formaldehyde. Sodium bisulphite is preferred in the case of the instant invention.

Obviously, the selection of the reducing agent depends on the redox potential of the coloring agents of the reducible inks as well as of the ink bearing the reducing agent. The selection of the coloring substances and the reducing agent depends on the combination between the redox potential of the reducing agent and the redox potentials of reducible coloring substances and the coloring substance formulated in the ink carrying the reducing agent (eraser).

Preparation of reducible and non reducible inks is simple, known, and available to those skilled in the art. It comprises formulation of the selected coloring substances in solutions of suitable solvents with pH adjusting additives, e.g. bases for creating a solvent medium with a suitable pH for the development of the reducible ink reaction; suitable bases are, for example, diethanol and triethanolamine, specially triethanolamine.

The following example corresponds to a set of inks comprised by a reducing ink (A) and a reducible ink (B) formulated in accordance with the instant invention, included with illustrative purposes, not limiting the scope of the invention.

EXAMPLE 1

| Reducing ink (A) (fluorescent yellow color) | % w/w | Reducible ink (B) (blue color) | % w/w |
| --- | --- | --- | --- |
| Sodium sulphite | 10.0 | Basic Violet 10 | 0.50 |
| Solvent Green 7 | 2.0 | Basic Blue 9 | 0.25 |
| Chloroacetamide | 0.1 | Basic Green 1 | 0.25 |
| Glycerin | 12.0 | Chloroacetamide | 0.1 |
| Triethanolamine 85% | 18.0 | Glycerin | 6.0 |
|  |  | Propyleneglycol | 9.0 |
| Deionized water c.s.p. | 100.0 | Deionized water c.s.p. | 100.0 |

When the reducible ink is mixed on a substrate with the reducing ink or when a line drafted with said reducible ink is covered with the reducing ink, the mixture or the portions of the reducible ink covered with the reducing ink, take unexpectedly a brilliant brown color—reduction color—instead of the expected violet produced with the conventional "eraser" (colorless), formulation of which corresponds to that indicated as (A) but without the coloring agent (Solvent Green 7).

The assembly or set of multiple color inks according to the invention may be used, as well as those known inks called "magic inks" for making multiple color figures, drawings, legends, etc. on paper, cardboard, cloth, by means of conventional writing or drawing instruments, such as known fiber or ball pencils or pens.

In practice, writing and drawing instruments are available in assemblies or sets comprised by several different reducible color instruments or units and at least one unit or instrument dispensing simultaneously the reducing agent and the non reducible coloring substance, formulated in the same non reducible ink.

In accordance with the invention, there are also assemblies or kits including two or more non reducible color units, apart from the plurality of reducible color units, each of which dispenses the reducing agent, i.e. more than one color unit in which the reducing agent is formulated with a different non reducible coloring substance; optionally, said assemblies or sets may include further a conventional instrument dispensing only the reducing agent. Any of these two alternatives broadens the chromatic possibilities of writing and drawing inks and instruments of the instant invention.

I claim:

1. A set of inks for forming polychromatic markings, comprising:

a first reservoir, a first ink, disposed in said first reservoir, comprising a reducible colorant provided in oxidized form, in which form said colorant produces a marking of a first color when applied to white paper, said reducible colorant producing, when applied to white paper and reduced, a visible marking having a second color different from said first color, a second reservoir, and a second ink, disposed in said second reservoir, comprising a reducing agent selected to reduce said reducible colorant, and a second, non-reducible colorant that, when applied to white paper, produces a marking having a third color that is different from said first and second colors.

2. The set of inks of claim 1 further comprising a plurality of reservoirs, each reservoir containing an ink comprising a different reducible colorant provided in oxidized form.

3. The set of inks of claim 1 wherein said first and second reservoirs are disposed in first and second writing instruments.

4. The set of inks of claim 1 wherein said reducible and non-reducible colorants are selected to provide, when said first and second inks contact each other, a marking having a fourth color, different from said first, second and third colors.

5. The set of inks of claim 1 wherein said second, non-reducible colorant is selected from the group consisting of Direct Blue 86, Solvent Green 7, Acid Red 52, Acid Blue 1, and mixtures thereof.

6. The set of inks of claim 1 or 5 wherein said first, reducible colorant is selected from the group consisting of Basic Red 18, Basic Red 14, Basic Red 49, Food Red 7, Basic Yellow 28, Acid Yellow 9, Acid Blue 93:2, Basic Blue 9, Basic Green 4, Basic Green 1, Basic Violet 10, Acid Orange 8 and mixtures thereof.

7. The set of inks of claim 1 wherein said reducing agent is selected from the group consisting of salts of sulfites, bisulfites, thiosulfites and hydrosulfites.

8. The set of inks of claim 7 wherein said reducing agent is sodium sulfite.

9. The set of inks of claim 1 wherein one or both of said first and second inks includes a base.

10. The set of inks of claim 9 wherein said base is triethanolamine.

11. The set of inks of claim 1 wherein said first reservoir and said second reservoir are disposed in a single writing instrument.

12. The set of inks of claim 1 wherein said reducing agent is an organic compound selected from the group consisting of hydroquinone and formaldehyde.

13. The set of inks of claim 1 or claim 14 further comprising a plurality of reservoirs, each reservoir containing an ink comprising a reducing agent and a different non-reducible colorant.

14. The set of inks of claim 1 further comprising a reservoir containing a reducing agent diluted into a colorless vehicle.

* * * * *